(12) United States Patent
Chu

(10) Patent No.: US 8,482,482 B2
(45) Date of Patent: Jul. 9, 2013

(54) DISPLAY SYSTEM AND METHOD

(75) Inventor: Ting-Ting Chu, New Taipei (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 185 days.

(21) Appl. No.: 13/217,276

(22) Filed: Aug. 25, 2011

(65) Prior Publication Data

US 2013/0027431 A1   Jan. 31, 2013

(30) Foreign Application Priority Data

Jul. 25, 2011   (TW) .................................. 100126101

(51) Int. Cl.
*G09G 5/00* (2006.01)

(52) U.S. Cl.
USPC .............................. 345/1.3; 345/3.3; 345/3.1

(58) Field of Classification Search
None
See application file for complete search history.

(56) References Cited

U.S. PATENT DOCUMENTS

| 6,340,957 B1 * | 1/2002 | Adler et al. ..................... 345/1.3 |
| 2009/0109125 A1 * | 4/2009 | Young et al. .................... 345/1.3 |

* cited by examiner

*Primary Examiner* — Xiao M. Wu
*Assistant Examiner* — Steven Elbinger
(74) *Attorney, Agent, or Firm* — Altis Law Group, Inc.

(57) ABSTRACT

An exemplary electronic device is capable of communicating with one other electronic device including a slave display unit. The electronic device includes a master display unit, sensors, and a processor. The master display unit and the at least one slave display unit cooperatively form a united display unit. The master display unit has sub-display areas. The sensors are arranged on the master display unit. The processor determines the position of the slave display unit relative to the master display unit according to the sensors, establish a minimum virtual display area M×N, and determine maximum actual rectangle display area m×n that the united display unit has. The processor further divides an image to m×n sub-images, transmit the sub-images displayed by the slave display unit to the another electronic device, and further control the master display unit to display the determined sub-images.

9 Claims, 7 Drawing Sheets

DISPLAY SYSTEM AND METHOD

BACKGROUND

1. Technical Field

The present disclosure relates to display systems and, particularly, to a display system having multiple electronic devices to display a whole-image, an electronic device, and a display method.

2. Description of Related Art

Displaying a high definition image often needs a large display screen. However, for an electronic device with a small size display screen, displaying a high definition image is often limited. Although a zoom option can be selected to enlarge the image to view the detail of the image, the image can not be viewed integrally. Thereby, a display system having a larger size display screen is desired.

BRIEF DESCRIPTION OF THE DRAWINGS

The components of the drawings are not necessarily drawn to scale, the emphasis instead being placed upon clearly illustrating the principles of the present disclosure. Moreover, in the drawings, like reference numerals designate corresponding parts throughout several views.

DETAILED DESCRIPTION

The embodiments of the present disclosure are now described in detail, with reference to the accompanying drawings.

Figure 1:
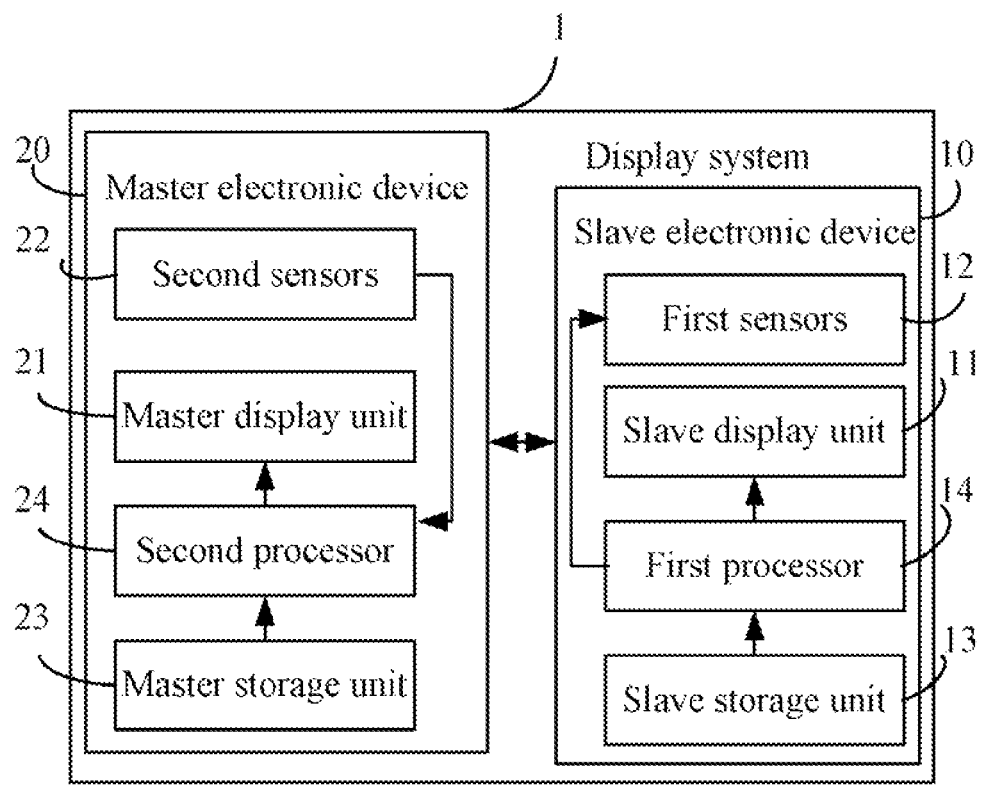
FIG. 1 is a block diagram of a display system in accordance with an exemplary embodiment, the display system including a slave electronic device and a master electronic device.
Figure 2:
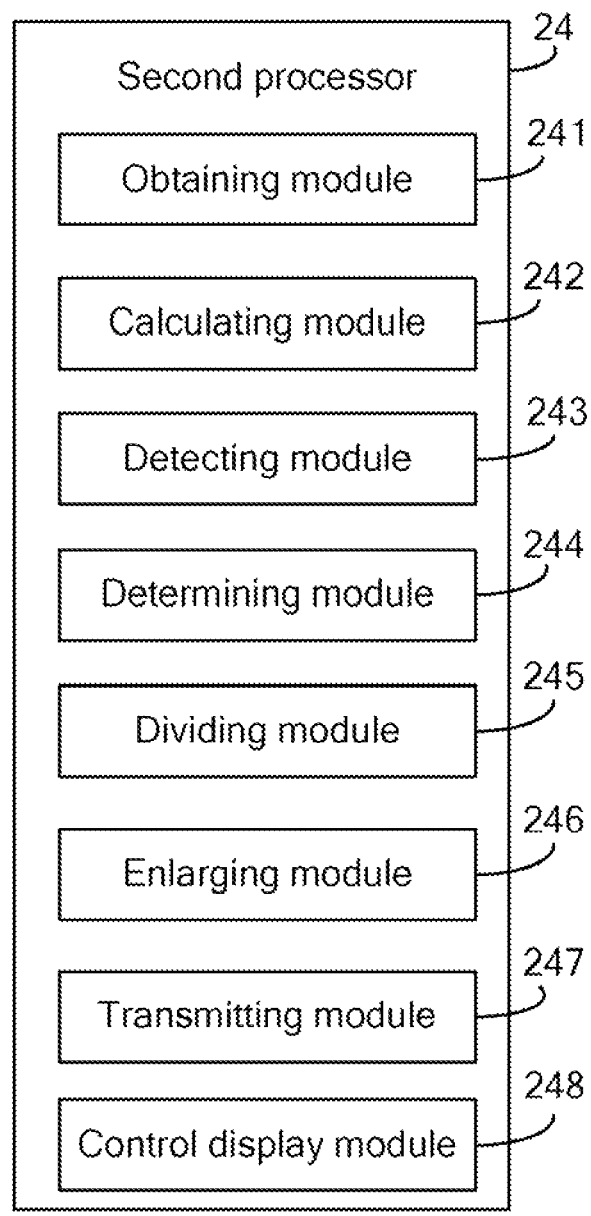
FIG. 2 is a schematic diagram of main function modules of a second processor of the display system of FIG. 1 in accordance with an exemplary embodiment.

Referring to FIGS. 1-2, a block diagram of a display system 1 in accordance with an exemplary embodiment is shown. The display system 1 includes at least one slave electronic device 10 and a master electronic device 20. The master electronic device 20 and the at least one slave electronic device 10 cooperatively display an image. For the simplicity, only one slave electronic device 10 is described hereinafter. The slave electronic device 10 communicates with the master electronic device 20 through a wired or wireless connections. In the embodiment, the slave electronic device 10 and the master electronic device 20 may be a device with a small display unit, such as mobile phones, PDAs, for example.

The slave electronic device 10 includes a slave display unit 11, a number of first sensors 12, a slave storage unit 13, and a first processor 14.

The master electronic device 20 includes a master display unit 21, a number of second sensors 22, a master storage unit 23, and a second processor 24.

The slave display unit 11 and the master display unit 21 respectively include a number of sub-display areas. The slave display unit 11 and the master display unit 21 can be united together to form a united display unit 25 (see FIG. 3). The first sensors 12 and the second sensors 22 are respectively arranged on the slave display unit 11 and the master display unit 21 to detect whether the two display units 11 and 21 abut.

The slave storage unit 13 stores pixels per inch (PPI) of the slave display unit 11, a lateral resolution of the slave display unit 11, and an axial resolution of the slave display unit 11. For simplicity, the PPI of the slave display unit 11 is represented as PPI1, the lateral resolution of the slave display unit 11 is represented as Rw1, and the axial resolution of the slave display unit 11 is represented as Rh1.

The master storage unit 23 stores PPI of the master display unit 21, a lateral resolution of the master display unit 21, and an axial resolution of the master display unit 21. For simplicity, the PPI of the master display unit 21 is represented as PPI2, the lateral resolution of the master display unit 21 is represented as Rw2, and the axial resolution of the master display unit 21 is represented as Rh2.

The second processor 24 includes an obtaining module 241, a calculating module 242, a detecting module 243, a determining module 244, a dividing module 245, an enlarging module 246, a transmitting module 247, and a control display module 248.

The obtaining module 241 obtains the stored PPI1, Rw1, Rh1, PPI2, Rw2, and Rh2 when the sensors 22 determine that the slave electronic device 10 is abut against the master electronic device 20.

The calculating module 242 determines the number of the sub-display areas that the slave display unit 11 and the master display unit 21 respectively have in the horizontal direction and in the vertical direction according to the obtained PPI1, Rw1, Rh1, PPI2, Rw2, and Rh2. The method of determining the number of the sub-display areas that the slave display unit 11 and the master display unit 21 respectively have in the horizontal direction and the vertical direction is described as followed.

The calculating module 242 compares the PPI1 with the PPI2 to determine which is the minimum PPI (hereinafter, PPImin) between PPI1 and PPI2, divide PPImin by PPI1 to obtain a multiple a, and divide PPImin by PPI2 to obtain a multiple b. In the embodiment, when PPI1 is PPImin, the multiple a is one, and when PPI2 is PPImin, the multiple b is one. The calculating module 242 is further to determine the greatest common divisor of Rw1/$a$ and Rh1/$b$ to determine a lateral basic resolution Rw of the united display unit 25, and determine the greatest common divisor of Rw2/$a$ and Rh2/$b$ to determine an axial basic resolution Rh of the united display unit 25. In the embodiment, the calculating module 242 is further to divide the lateral basic resolution Rw of the united display unit 25 by the lateral resolution of the slave display unit 11 to determine the number of the sub-display areas that the slave display unit 11 has in the horizontal direction, and divide the axial basic resolution Rh of the united display unit 25 by the axial resolution of the slave display unit 11 to determine the number of the sub-display areas that the slave display unit 11 has in the vertical direction. The calculating module 242 also divides the lateral basic resolution Rw of the united display unit 25 by the lateral resolution of the master display unit 21 to determine the number of the sub-display areas that the master display unit 21 has in the horizontal direction, and divides the axial basic resolution Rh of the united display unit 25 by the axial resolution of the master display unit 21 to determine the number of the sub-display areas that the master display unit 21 has in the vertical direction.

The detecting module 243 determines a position of the slave display unit 11 relative to the master display unit 21 according to the detection of the sensors 12, 22. The method of determining the position of the slave display unit 11 relative to the master display unit 21 according to the detection of the sensors 12, 22 is disclosed by Chinese patent application NO. CN201110136083, which is hereby incorporated by reference. The detecting module 243 further determines the maximum number of sub-display areas M that the united display unit 25 has in the horizontal direction, according to the determined position of the slave electronic device 10 relative to the master electronic device 20 and the determined number of the sub-display areas that the slave display unit 11 and the master display unit 21 respectively have in the horizontal direction and the vertical direction. The detecting module 243 further determines the maximum number of the sub-display areas N that the united display unit 25 has in the vertical direction, according to the determined position of the slave electronic device 10 relative to the master electronic device 20 and the determined number of the sub-display areas that the slave display unit 11 and the master display unit 21 respectively have in the horizontal direction and the vertical direction, and establishes a minimum virtual display area M×N.

Figure 3:
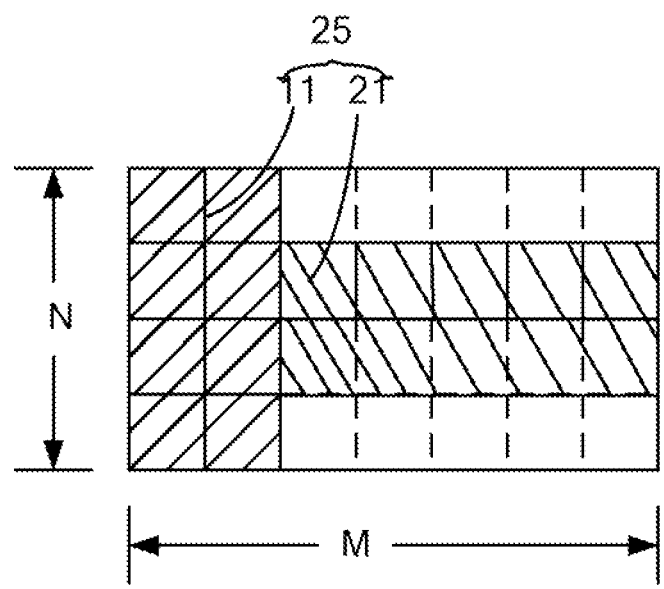
FIG. 3 shows a minimum virtual display area M×N when a position of the slave electronic device relative to the master electronic device is in a first position according to a first embodiment.
Figure 4:
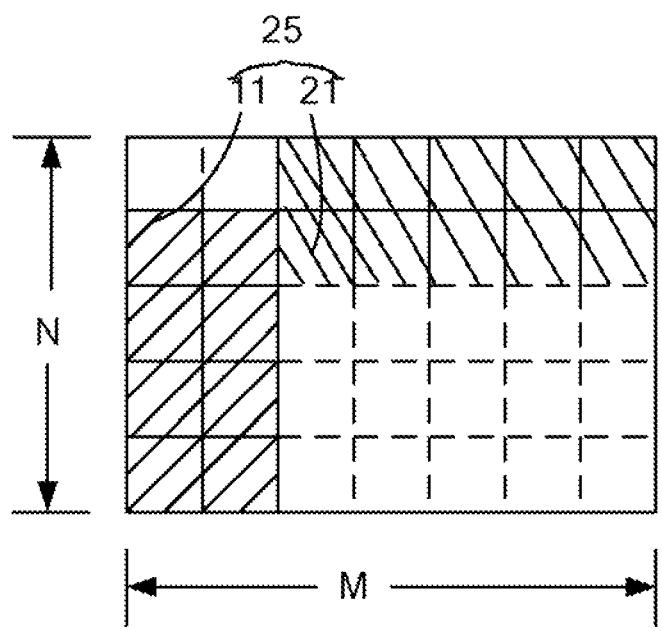
FIG. 4 shows a minimum virtual display area M×N when a position of the slave electronic device relative to the master electronic device is in a second position according to a second embodiment.

Referring to FIGS. 3-4, for example, assuming that the number of the sub-display areas that the slave display unit 11 has in the horizontal direction and the vertical direction are 2 and 4 respectively, and the number of the sub-display areas that the master display unit 21 has in the horizontal direction and the vertical direction are 5 and 2 respectively. When the detecting module 243 determines that the position of the slave display unit 11 relative to the master display unit 21 is shown as FIG. 3, the minimum virtual rectangle display area M×N established is 7×4. When the detecting module 243 determines that the position of the slave display unit 11 relative to the master display unit 21 is shown as FIG. 4, the minimum virtual display area M×N established is 7×5.

Figure 5:
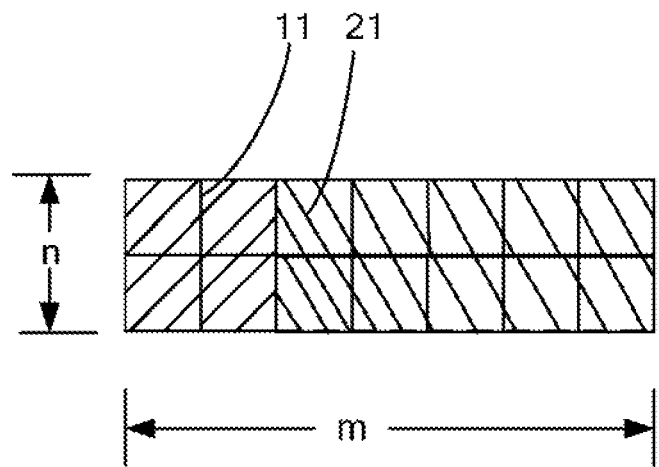
FIG. 5 shows a maximum actual display area m×n, which is determined according to the minimum virtual display area M×N of FIG. 3.
Figure 6:
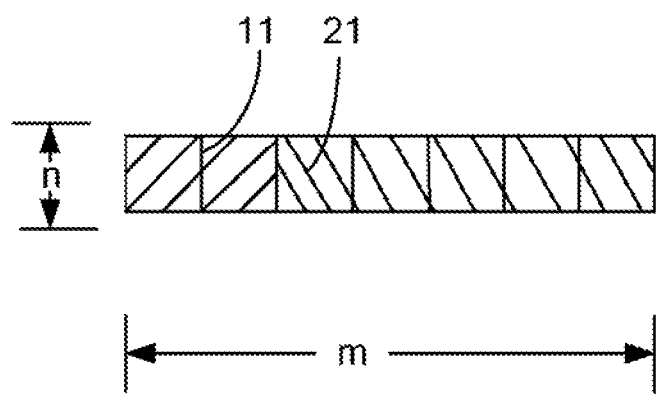
FIG. 6 shows a maximum actual display area m×n, which is determined according to the minimum virtual display area M×N of FIG. 4.

The determining module 244 determines the maximum actual display area m×n that the united display unit 25 has according to the Divide and Conquer algorithm and the minimum virtual display area M×N. Wherein m and n are the actual number of sub-display areas that the united display unit 25 has in the horizontal direction and in the vertical direction. The determining module 244 further determines the actual sub-display areas that the slave display unit 11 and the master display unit 21 have in the maximum actual display area m×n, according to the determined position of the slave display unit 11 relative to the master display unit 21 and the determined maximum actual display area m×n that the united display unit 25 has. On each actual sub-display area, one sub-image is displayed. For example, when the position of the slave display unit 11 relative to the master display unit 21 is shown as FIG. 3, the maximum actual rectangle display area m×n is shown as FIG. 5, when the position of the slave display unit 11 relative to the master display unit 21 is shown as FIG. 4, the maximum actual rectangle display area m×n is shown as FIG. 6.

The dividing module 245 divides an image into m×n sub-images according to the maximum actual rectangle display area m×n, and determines the sub-images displayed by the slave display unit 11 according to the determined actual sub-display areas that the slave display unit 11 has in the display area m×n. The dividing module 245 further determines the sub-images displayed by the master display unit 21 according to the determined actual sub-display areas that the master display unit 21 has in the display area m×n.

The enlarging module 246 is to respectively determine a magnification of the sub-images displayed by the slave display unit 11 and a magnification of the sub-images displayed by the master display unit 21, and respectively enlarge the sub-images displayed by the slave display unit 11 and the sub-images displayed by the master display unit 21 according to the determined magnification respectively.

In the embodiment, the enlarging module 246 respectively determines the magnification of the sub-images displayed by the slave display unit 11 and the magnification of the sub-images displayed by the master display unit 21 in the horizontal direction according to a formula (1) as followed.

$$T_w = \frac{Rw \times m}{Iw} \times \frac{PPIx}{PPImin} \quad (1)$$

wherein $T_w$ is the magnification of the sub-images displayed by the slave display unit 11 or the magnification of the sub-images displayed by the master display unit 21 in the horizontal direction, Rw is the lateral basic resolution of the united display unit 25, m is the determined actual number of the sub-display areas that the united display unit 25 has in the horizontal direction, Iw is the PPI of the image in the horizontal direction, PPIx is the PPI of the slave display unit 11 or the PPI of the master display unit 21, PPImin is the minimum PPI between the slave display unit 11 and the master display unit 21.

In the embodiment, the enlarging module 246 respectively determines the magnification of the sub-images displayed by the slave display unit 11 and the magnification of the sub-images displayed by the master display unit 21 in the vertical direction according to a formula (2) as followed.

$$T_h = \frac{Rh \times n}{Ih} \times \frac{PPIx}{PPImin} \quad (2)$$

wherein $T_h$ is the magnification of the sub-images displayed by the slave display unit 11 or the magnification of the sub-images displayed by the master display unit 21 in the vertical direction, Rh is the axial basic resolution of the united display unit 25, n is the actual number of the sub-display areas that the united display unit 25 has in the vertical direction, Ih is the PPI of the image in the vertical direction, PPIx is the PPI of the slave display unit 11 or the PPI of the master display unit 21, PPImin is the minimum PPI between the slave display unit 11 and the master display unit 21.

The transmitting module 247 is to transmit the enlarged sub-images displayed by the slave display unit 11 to the slave electronic device 10, to trigger the first processor 14 to control the slave display 11 to display the corresponding sub-images on the determined actual sub-display areas.

The control display module 248 is to control the master display unit 21 to display the corresponding enlarged sub-images on the determined actual sub-display areas.

Figure 7:
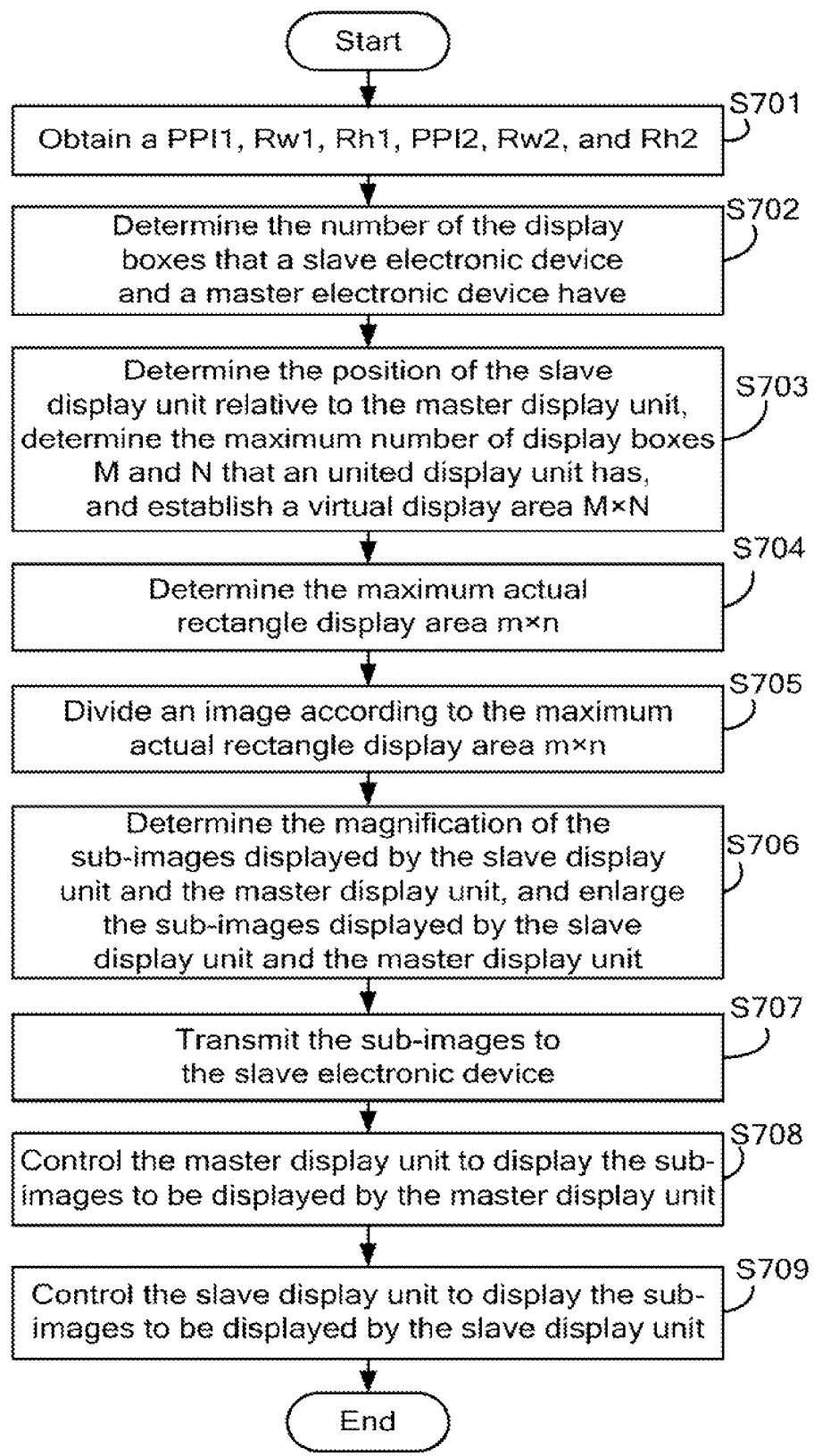
FIG. 7 is a flowchart of a display method in accordance with an exemplary embodiment.

Referring to FIG. 7, a display method in accordance with an exemplary embodiment is shown. The display method is applied on the display system 1 as FIG. 1.

In step S701, the obtaining module 241 obtains the PPI1, Rw1, Rh1, PPI2, Rw2, and Rh2 when the sensors 12,22 detects that the slave display unit 11 is abut against the master display unit 21.

In step S702, the calculating module 242 respectively determines the number of sub-display areas that the slave display unit 11 has in the horizontal direction and in the vertical direction, and determines the number of sub-display areas that the master display unit 21 has in the horizontal direction and in the vertical direction.

In step S703, the detecting module 243 determines the position of the slave display unit 11 relative to the master display unit 21 according to the sensors 12, 22, and respectively determines the maximum number of the sub-display areas M that the united display unit 25 has in the horizontal direction, according to the determined position of the slave display unit 11 relative to the master display unit 21 and the number of the sub-display areas that the slave display unit 11 and the master display unit 21 has in the horizontal direction and in the vertical direction. The detecting module 243 determines the maximum number of the sub-display areas N that the united display unit 25 has in the vertical direction, according to the determined position of the slave display unit 11 relative to the master display unit 21 and the number of the sub-display areas that the slave display unit 11 and the master display unit 21 has in the horizontal direction and in the vertical direction, and further establishes a minimum virtual display area M×N.

In step S704, the determining module 244 determines the actual maximum rectangle display area m×n that the united display unit 25 has according to the Divide and Conquer algorithm and the minimum virtual display area M×N, and determine the actual sub-display areas that the slave display unit 11 and the master display unit 21 respectively have in the maximum rectangle display area m×n.

In step S705, the dividing module 245 divides the image into m×n sub-images according to the maximum actual display area m×n, and respectively determines the sub-images displayed by the slave display unit 11 and the sub-images displayed by the master display unit 21 according to the determined actual sub-display areas that the slave display unit 11 and the master display unit 21 have in the maximum actual rectangle display area m×n.

In step S706, the enlarging module 246 respectively determines the magnification of the sub-images displayed by the slave display unit 11 and the master display unit 21, and enlarges the sub-images displayed by the slave display unit 11 and the master display unit 21 according to the determined magnification.

In step S707, the transmitting module 247 transmits the enlarged sub-images to be displayed by the slave display unit 11 to the slave electronic device 10.

In step S708, the control display module 248 controls the master display unit 21 to display the sub-images to be displayed by the master display unit on the determined actual sub-display areas In step S709, the processor 14 controls the slave display 11 to display the corresponding sub-images to be displayed by the slave display unit on the determined actual sub-display areas.

Although the present disclosure has been specifically described on the basis of the exemplary embodiment thereof, the disclosure is not to be construed as being limited thereto. Various changes or modifications may be made to the embodiment without departing from the scope and spirit of the disclosure.

What is claimed is:

1. A display system comprising:
at least one slave electronic device, each slave electronic device comprising:
a slave display unit comprising a plurality of sub-display areas;
a plurality of first sensors arranged on the slave display unit; and
a first processor; and
a master electronic device capable of communicating with the slave electronic device, the master electronic device comprising:
a master display unit comprising a plurality of sub-display areas, the master display unit and the at least one slave display unit forming a united display unit when each slave display unit is abut against the master display unit;
a plurality of second sensors arranged on the master display unit; and
a second processor comprising:
a detecting module to determine a position of each slave display unit relative to master display unit via the first sensors and the second sensors, determine the maximum number of sub-display areas M that the united display unit has in the horizontal direction according to the determined position of the slave display unit relative to the master display unit and the number of the sub-display areas that the at least one slave electronic device and the master electronic device have, determine the maximum number of the sub-display areas N that the united display unit has in the vertical direction according to the determined position of each slave display unit relative to the master display unit and the number of the sub-display areas that the at least one slave electronic device and the master electronic device have, and further establish a minimum virtual display area M×N;
a determining module to determine the maximum actual rectangle display area m×n according to a Divide Conquer algorithm and the minimum virtual display area M×N, and respectively determine actual sub-display areas that the master display unit and the at least one slave display unit have in the maximum actual rectangle display area m×n according to the determined position of each slave display unit relative to the master display unit and the determined maximum actual rectangle display area m×n that the united display unit 25 has, wherein m and n being the number of the sub-display areas that the united display unit respectively have in the horizontal direction and in the vertical direction;
a dividing module to divide an image into m×n sub-images according to the maximum actual rectangle display area m×n, determine the number of sub-images to be displayed by the master display unit according to the actual sub-display areas that the master display unit has in the maximum actual rectangle display area m×n, and determine the number of sub-images to be displayed by each slave display unit according to the actual sub-display areas that the slave display unit has in the maximum actual rectangle display area m×n;
a transmitting module to transmit the sub-images to be displayed by the least one slave display unit to the at least one slave electronic device;

a control display module to control the master display unit to display the determined number of sub-images on the determined actual sub-display areas of the master display unit; and the at least one first processor to control the at least one slave display unit to display the transmitted sub-images on the determined actual sub-display areas of the least one slave display unit.

2. The display system as described in claim 1, wherein the master electronic device further comprises a master storage unit storing pixel per inch (PPI) of the master display unit, a lateral resolution of the master display unit, and an axial resolution of the master display unit, the at least one slave electronic device further comprises a slave storage unit storing PPI of the at least one slave display unit, a lateral resolution of the at least one slave display unit, and an axial resolution of the at least one slave display unit, the second processor further comprises an obtaining module and a calculating module, the obtaining module is to obtain the PPI of the master display unit, the lateral resolution of the master display unit, the axial resolution of the master display unit, the PPI of each slave display unit, the lateral resolution of each slave display unit, and the axial resolution of each slave display unit when the first sensors and the second sensors determine that the at least one slave display unit is abut against to the master display unit, the calculating module is to determine the number of the sub-display areas that the master display unit has in the horizontal direction and in the vertical direction according to the obtained PPI of the master display unit, the lateral resolution of the master display unit, and the axial resolution of the master display unit, and determine the number of the sub-display areas that each slave display unit has in the horizontal direction and in the vertical direction according to the obtained PPI of each slave display unit, the lateral resolution of each slave display unit, and the axial resolution of each slave display unit.

3. The display system as described in claim 1, wherein the master electronic device further comprises an enlarging module to determine the magnification of the sub-images displayed by the master display unit and the magnification of the sub-images displayed by the at least one slave display unit, and enlarge the sub-images displayed by the master display unit and the sub-images displayed by the at least one slave display unit according to the determined magnification.

4. An electronic device communicating with at least another electronic device comprising a slave display unit, the electronic device comprising:

a master display unit and the at least one slave display unit cooperatively forming a united display unit, the master display unit and the at least one slave display unit respectively having a plurality of sub-display areas;

a plurality of sensors arranged on the master display unit; and a processor comprising:

a detecting module to determine a position of each slave display unit relative to the master display unit according to the sensors, determine the maximum number of sub-display areas M that the united display unit has in the horizontal direction according to the determined position of each slave display unit relative to the master display unit and the number of the sub-display areas that the at least one slave display unit and the master display unit have, determine the maximum number of the sub-display areas N that the united display unit has in the vertical direction according to the determined position of each slave display unit relative to the master display unit and the number of the sub-display areas that the at least one slave display unit and the master display unit have, and further establish a minimum virtual display area M×N;

a determining module to determine the maximum actual rectangle display area m×n that the united display unit has according to a Divide Conquer algorithm and the minimum virtual display area M×N, and respectively determines actual sub-display areas that the master display unit and the at least one slave display unit have in the maximum actual rectangle display area according to the determined position of each slave display unit relative to the master display unit and the determined maximum actual rectangle display area m×n that the united display unit has;

a dividing module to divide an image to m×n sub-images according to the maximum actual rectangle display area m×n, and respectively determine the sub-images displayed by master display unit and the sub-images displayed by the at least one slave display unit according to the determined actual sub-display areas that the master display unit and the at least one slave display unit have in the maximum actual rectangle display area m×n;

a transmitting module to transmit the sub-images to be displayed by the at least one slave display unit to the another electronic device to trigger the at least one slave display unit to display corresponding sub-images on the corresponding actual sub-display areas; and a control display module to control the master display unit to display the determined sub-images on the determined actual sub-display areas of the master display unit.

5. The electronic device as described in claim 4, wherein the master electronic device further comprises a master storage unit storing pixel per inch (PPI) of the master display unit, a lateral resolution of the master display unit, and an axial resolution of the master display unit, the processor further comprises an obtaining module and a calculating module, the obtaining module is to obtain the PPI of the master display unit, the lateral resolution of the master display unit, and the axial resolution of the master display unit when the sensors determines that the at least one slave display unit is abut against to the master display unit, the calculating module is to determine the number of the sub-display areas that the master display unit has in the horizontal direction and in the vertical direction according to the obtained PPI of the master display unit, the lateral resolution of the master display unit, and the axial resolution of the master display unit.

6. The electronic device as described in claim 4, wherein the electronic device further comprises an enlarging module to respectively determine the magnification of the sub-images displayed by the master display unit and the at least one slave display unit, and further enlarge the sub-images displayed by the master display unit and the at least one slave display unit according to the determined magnification.

7. A display method, the display method is applied on a display system, the display system comprising a master electronic device and at least one slave electronic device, the at least one slave electronic device being capable of communicating with the master electronic device, the at least one slave electronic device comprising a slave display unit and a plurality of first sensors, the master electronic device comprising a master display unit and a plurality of second sensors, the at least one slave display unit and the master display unit respectively having a plurality of sub-display areas, the slave display unit and the master display unit formed a united display unit when the at least one slave display unit is abut against the master display unit, the first sensors being arranged on the at least one slave display unit, the second sensors being arranged on the master display unit, wherein the method further comprises:

determining a position of each slave display unit relative to the master display unit via the first sensors and the second sensors, determining the maximum number of the sub-display areas M that the united display unit has in the horizontal direction according to the determined position of each slave display unit relative to the master display unit, and the number of the sub-display areas that the at least one slave display unit and the master display unit have, determining the maximum number of the sub-display areas N that the united display unit has in the vertical direction according to the determined position of each slave display unit relative to the master display unit, and the number of the sub-display areas that the at least one slave display unit and the master display unit have, and further establish a minimum virtual display area M×N;

determining the maximum actual rectangle display area m×n that the united display unit has according to a Divide Conquer algorithm and the minimum virtual display area M×N, and determining actual sub-display areas that the at least one slave display unit and the master display unit have in the maximum actual rectangle display area m×n according to the determined position of each slave display unit relative to the master display unit and the determined maximum actual rectangle display area m×n that the united display unit has;

dividing an image to m×n sub-images according to the maximum actual rectangle display area m×n that the united display unit has, determining the sub-images displayed by the master display unit according to the actual sub-display areas that the master display unit has, and determining the sub-images displayed by the at least one slave display unit according to the actual sub-display areas that the at least one slave display unit has;

transmitting the sub-images to be displayed by the at least one slave display unit to the at least one slave electronic device;

controlling the master display unit to display the determined sub-images on the determined actual sub-display areas of the master display unit; and controlling the at least one slave display unit to display the transmitted sub-images on the determined actual sub-display areas of the at least one slave display unit.

8. The display method as described in claim 7, wherein the master electronic device further comprises a master storage unit storing PPI of the master display unit, a lateral resolution of the master display unit, and an axial resolution of the master display unit, the at least one slave electronic device further comprises a slave storage unit storing PPI of the at least one slave display unit, a lateral resolution of the at least one slave display unit, and an axial resolution of the at least one slave display unit, the step of "determining the number of the sub-display areas that the master display unit and the at least one slave display unit have" comprises:

obtaining the PPI of the master display unit, the lateral resolution of the master display unit, the axial resolution of the master display unit, the PPI of the at least one slave display unit, the lateral resolution of the at least one slave display unit, and the axial resolution of the at least one slave display unit when the first sensors and the second sensors determine that the at least one slave display unit is abut against the master display unit; and determining the number of the sub-display areas that the master display unit and the at least one slave display unit have in the horizontal direction and vertical direction according to the obtained PPI of the master display unit, the lateral resolution of the master display unit, the axial resolution of the master display unit, the PPI of the at least one slave display unit, the lateral resolution of the at least one slave display unit, the axial resolution of the at least one slave display unit.

9. The display method as described in claim 7, wherein the method further comprises:

determining the magnification of the sub-images displayed by the master display unit and the magnification of the sub-images displayed by the at least one slave display unit, and further enlarging the sub-images displayed by the master display unit and the sub-images displayed by the at least one slave display unit according to the determined magnification.

\* \* \* \* \*